US011297025B2

(12) United States Patent
Lee et al.

(10) Patent No.: US 11,297,025 B2
(45) Date of Patent: Apr. 5, 2022

(54) METHOD FOR CONTROLLING NOTIFICATION AND ELECTRONIC DEVICE THEREFOR

(71) Applicant: Samsung Electronics Co., Ltd., Suwon-si (KR)

(72) Inventors: Yuni Lee, Seoul (KR); Min-Kyung Lee, Seoul (KR); Unjoo Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/757,102

(22) PCT Filed: Aug. 6, 2018

(86) PCT No.: PCT/KR2018/008868
§ 371 (c)(1),
(2) Date: Apr. 17, 2020

(87) PCT Pub. No.: WO2019/083137
PCT Pub. Date: May 2, 2019

(65) Prior Publication Data
US 2020/0344196 A1    Oct. 29, 2020

(30) Foreign Application Priority Data

Oct. 24, 2017    (KR) .................. 10-2017-0138301

(51) Int. Cl.
*H04L 12/58*    (2006.01)
*G06F 3/0482*    (2013.01)
(Continued)

(52) U.S. Cl.
CPC ............ *H04L 51/24* (2013.01); *G06F 3/0482* (2013.01); *G06F 9/542* (2013.01); *G06Q 10/1093* (2013.01)

(58) Field of Classification Search
None
See application file for complete search history.

(56) References Cited

U.S. PATENT DOCUMENTS 7,504,966 B2 *   3/2009   Horstemeyer ....... G06Q 10/083
                                                   340/994
8,326,628 B2 *  12/2012   Goldstein ............... H04S 1/005
                                                   704/258

(Continued)

FOREIGN PATENT DOCUMENTS

EP    1 441 300 A1    7/2004
EP    2 806 621 A1    11/2014
(Continued)

OTHER PUBLICATIONS

European Search Report dated Oct. 23, 2020, issued in European Application No. 18871483.6.

(Continued)

*Primary Examiner* — Sargon N Nano
(74) *Attorney, Agent, or Firm* — Jefferson IP Law, LLP

(57) ABSTRACT

An operation method of an electronic device, according to various embodiments, comprises the steps of: displaying a notification list; determining a first notification among a plurality of notifications, which are included in the notification list, according to the detection of a first input; and displaying the notification list based on the determination. The first notification is maintained in the notification list even if a second input for initializing the notification list is detected. A second notification among the plurality of notifications is deleted from the notification list according to the detection of the second input.

8 Claims, 21 Drawing Sheets

(51) Int. Cl.
*G06F 9/54* (2006.01)
*H04L 51/224* (2022.01)
*G06Q 10/10* (2012.01)

(56) References Cited

U.S. PATENT DOCUMENTS

| | | | | |
|---|---|---|---|---|
| 8,761,737 | B2* | 6/2014 | Clarke | G06F 3/048 |
| | | | | 455/414.1 |
| 8,996,312 | B1* | 3/2015 | Freund | G06Q 10/047 |
| | | | | 701/533 |
| 9,270,628 | B2 | 2/2016 | Shia et al. | |
| 9,288,164 | B2* | 3/2016 | Vyrros | H04W 12/10 |
| 9,507,608 | B2* | 11/2016 | Chaudhri | G06F 3/0482 |
| 9,537,805 | B2 | 1/2017 | Cue et al. | |
| 9,560,631 | B2* | 1/2017 | Migicovsky | H04L 43/0811 |
| 9,690,820 | B1* | 6/2017 | Girulat, Jr. | G06Q 40/06 |
| 9,729,695 | B2 | 8/2017 | Seo et al. | |
| 10,963,145 | B1* | 3/2021 | Voss | H04M 1/72436 |
| 2002/0026461 | A1* | 2/2002 | Kutay | G06F 40/14 |
| | | | | 715/239 |
| 2003/0046300 | A1* | 3/2003 | Arai | G06F 16/904 |
| 2004/0051739 | A1* | 3/2004 | Schmickley | G08B 25/14 |
| | | | | 715/772 |
| 2007/0229517 | A1 | 10/2007 | May et al. | |
| 2008/0239881 | A1* | 10/2008 | Kokuryu | H04M 1/72522 |
| | | | | 368/73 |
| 2010/0036929 | A1* | 2/2010 | Scherpa | H04L 51/04 |
| | | | | 709/207 |
| 2011/0205576 | A1* | 8/2011 | Halron | G06F 16/93 |
| | | | | 358/1.15 |
| 2013/0174032 | A1* | 7/2013 | Tse | G06F 40/166 |
| | | | | 715/273 |
| 2013/0187769 | A1 | 7/2013 | Kim | |
| 2013/0326407 | A1* | 12/2013 | van Os | G06F 3/04883 |
| | | | | 715/810 |
| 2014/0032895 | A1* | 1/2014 | Moon | G04G 13/026 |
| | | | | 713/100 |
| 2015/0082212 | A1* | 3/2015 | Sharda | H04L 67/26 |
| | | | | 715/764 |
| 2015/0236990 | A1* | 8/2015 | Shan | H04L 51/046 |
| | | | | 709/206 |
| 2015/0346916 | A1 | 12/2015 | Jisrawi et al. | |
| 2015/0363059 | A1 | 12/2015 | Tsunoda et al. | |
| 2017/0203771 | A1 | 7/2017 | Malahy et al. | |
| 2017/0329322 | A1* | 11/2017 | Downor | G05B 19/0425 |
| 2017/0358004 | A1* | 12/2017 | Ahuja | H04B 5/0031 |
| 2018/0232114 | A1 | 8/2018 | Saunshi et al. | |
| 2019/0193653 | A1* | 6/2019 | Nakamura | G06F 9/4893 |
| 2019/0283623 | A1* | 9/2019 | Takebayashi | G01C 21/3476 |
| 2021/0303139 | A1* | 9/2021 | Voss | G06F 9/542 |

FOREIGN PATENT DOCUMENTS

| | | |
|---|---|---|
| KR | 10-0606759 B1 | 7/2006 |
| KR | 10-2007-0102108 A | 10/2007 |
| KR | 10-2013-0079049 A | 7/2013 |
| KR | 10-2014-0016041 A | 2/2014 |
| KR | 10-2015-0074351 A | 7/2015 |
| WO | 2017/026732 A1 | 2/2017 |

OTHER PUBLICATIONS

European Office Action dated Feb. 8, 2022, issued in European Patent Application No. 18 871 483.6.

* cited by examiner

METHOD FOR CONTROLLING NOTIFICATION AND ELECTRONIC DEVICE THEREFOR

TECHNICAL FIELD

The disclosure relates to a method for controlling a notification and an electronic device therefor.

BACKGROUND ART

As information communication technologies and semiconductor technologies develop, electronic devices provide various functions, and the fields that utilize electronic devices are expanding. In order to enable a user to easily recognize application events and the states of electronic devices that occur variously as the use of electronic devices increases, there are provided various schemes for effectively displaying a notification on a display.

DISCLOSURE OF INVENTION

Technical Problem

According to the conventional scheme for managing a plurality of notifications included in a notification list, an electronic device maintains an important notification in the notification list and deletes many unnecessary notifications one by one, or deletes all notifications simultaneously using a button for initializing the notification list. However, in this instance, the electronic device deletes notifications without taking into consideration the importance of a notification, and thus, the notification list is managed inefficiently, which is a drawback.

According to various embodiments of the disclosure, there are provided a method of efficiently managing a notification list and an electronic device supporting the same, which may maintain notifications selected by a user in a notification list, and may delete the other notifications simultaneously.

The technical subject matter of the document is not limited to the above-mentioned technical subject matter, and other technical subject matters which are not mentioned may be understood by those skilled in the art based on the following description.

Solution to Problem

In accordance with an aspect of the disclosure, an operation method of an electronic device may include displaying a notification list, determining a first notification among a plurality of notifications included in the notification list, upon detection of a first input, and displaying a notification list that is based on the determination. The first notification is maintained in the notification list even though a second input for initializing the notification list is detected. A second notification among the plurality of notifications is deleted from the notification list, upon detection of the second input.

In accordance with another aspect of the disclosure, an operation method of an electronic device may include displaying a notification list, determining one of a plurality of notifications included in the notification list, upon detection of a first input, displaying a plurality of time items related to the notification, detecting a second input for determining one of the plurality of time items, and displaying a notification list that is based on the detection. The notification is deleted from the notification list, and is added to the notification list as a time corresponding to the time item elapses.

In accordance with another aspect of the disclosure, an electronic device may include a display, and at least one processor. The at least one processor is configured to perform control so as to: display a notification list, determine a first notification among a plurality of notifications included in the notification list, upon detection of a first input, and display a notification list that is based on the determination. The first notification is maintained in the notification list even through a second input for initializing the notification list is detected. A second notification among the plurality of notifications is deleted from the notification list, upon detection of the second input.

In accordance with another aspect of the disclosure, an electronic device may include a display and at least one processor. The at least one processor is configured to perform control so as to: display a notification list, determine one of a plurality of notifications included in the notification list upon detection of a first input, display a plurality of time items related to the notification, detect a second input for determining one of the plurality of time items, and display a notification list that is based on the detection. The notification is deleted from the notification list, and is added to the notification list as a time corresponding to the time item elapses.

Advantageous Effects of Invention

According to various embodiments, an electronic device and a method therefor can efficiently manage a notification list, by pinning some of a plurality of notifications included in the notification list to prevent deletion, or by deleting some notifications from the notification list and adding the same again after a predetermined period of time.

Effects obtainable from the disclosure may not be limited to the above mentioned effects, and other effects which are not mentioned may be clearly understood, through the following descriptions, by those skilled in the art to which the disclosure pertains.

BEST MODE FOR CARRYING OUT THE INVENTION

Figure 1:
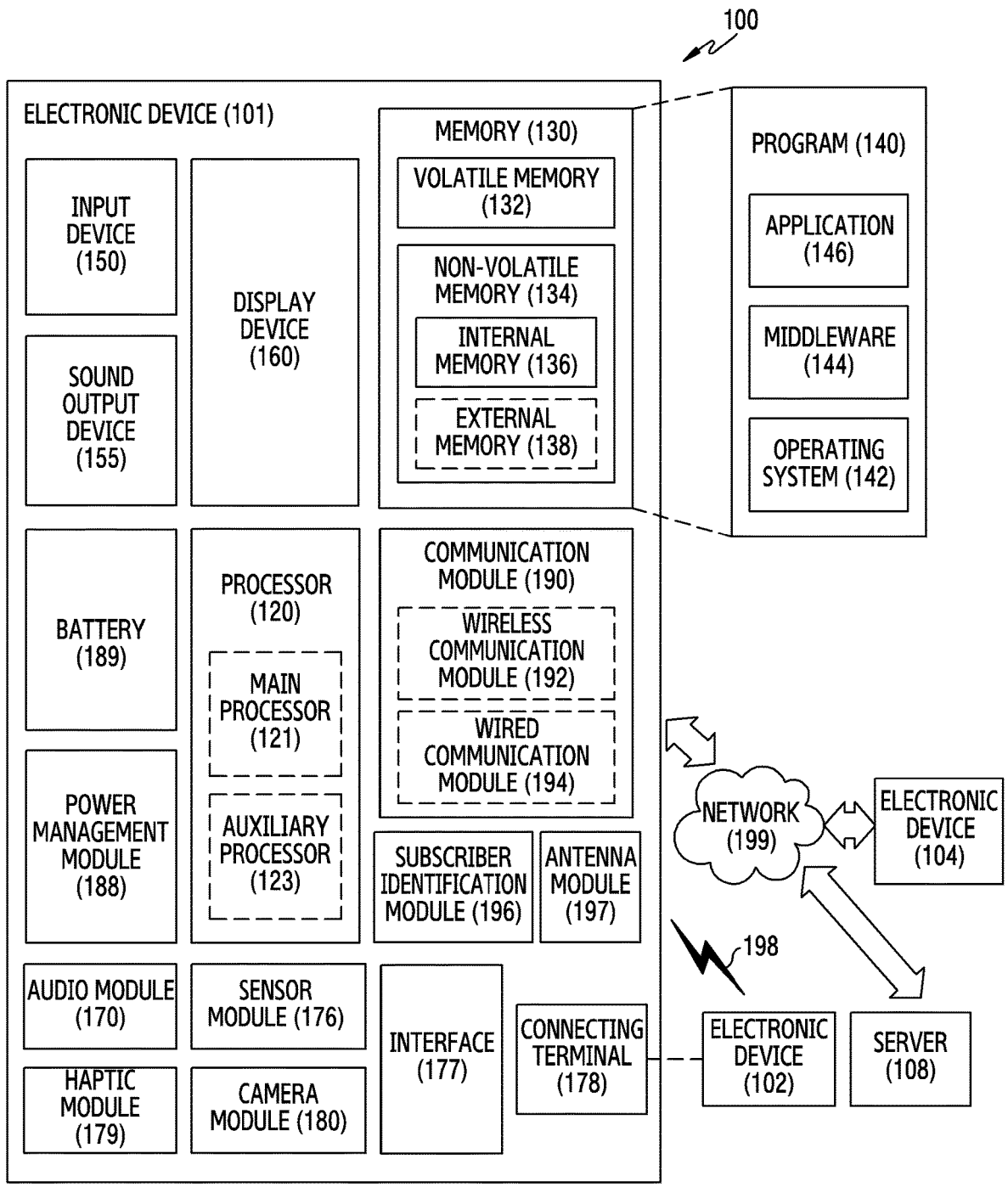
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
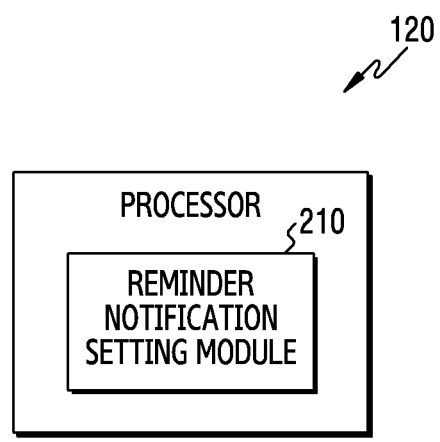
FIG. 2 is a block diagram of a processor according to various embodiments.

FIG. 2 is a block diagram of the processor 120 according to various embodiments.

Referring to FIG. 2, the processor 120 may include a reminder notification setting module 210. The reminder notification setting module 210 may determine one of a plurality of notifications included in a notification list to be a reminder notification. Here, the reminder notification may include a notification for which a pin function is set or a notification for which a snooze function is set.

According to some embodiments, the reminder notification setting module 210 may determine at least one of the plurality of notifications included in the notification list to be a notification for which a pin function is set. Here, the notification for which a pin function is set may refer to a notification that is pinned to prevent deletion from the notification list among the plurality of notifications included in the notification list. For example, the notification for which a pin function is set may not be deleted from the notification list even though an input for initializing the notification list or an input for deleting a notification from the notification list is detected. The notification for which a pin function is set may be called by "pinned notification" according to the technical meaning or other names having a technical meaning equivalent thereto. That is, the reminder notification setting module 210 may set a pin function for one of the plurality of notifications included in the notification list.

According to other embodiments, the reminder notification setting module 210 may determine at least one of the plurality of notifications included in the notification list to be a notification for which a snooze function is set. Here, the notification for which a snooze function is set may refer to a notification that is deleted from the notification list among the plurality of notifications included in the notification list, and is added and displayed again after a predetermined period of time. The notification for which a snooze function is set may be called by "on-off notification" according to the technical meaning or other names having a technical meaning equivalent thereto. That is, the reminder notification setting module 210 may set a snooze function for one of the plurality of notifications included in the notification list.

Figure 3:
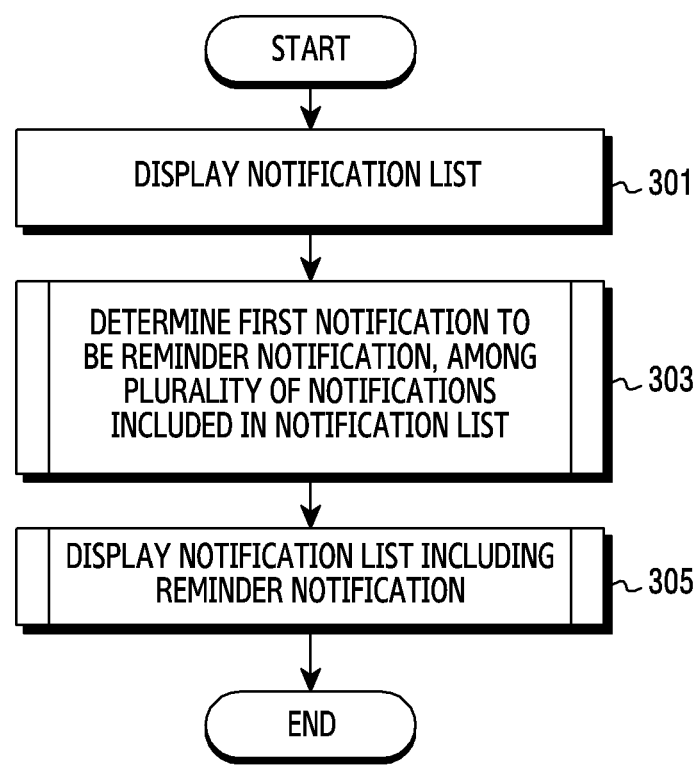
FIG. 3 is a flowchart illustrating operation of an electronic device according to various embodiments.

FIG. 3 is a flowchart illustrating operation of an electronic device according to various embodiments. Each operation in FIG. 3 may be performed by the electronic device 101 of FIG. 1, or the processor 120 of the electronic device 101.

Referring to FIG. 3, in operation 301, the processor 120 may display a notification list on the display device 160. Here, the notification list may include a plurality of notifications to indicate application events and states of terminals. For example, the plurality of notifications may include at least one of a message reception notification, an update notification by an operating system, a remaining battery charge notification, and a missed call notification.

In operation 303, the processor 120 may determine a first notification, to be a reminder notification, among the plurality of notifications included in the notification list. Here, the reminder notification may include a notification for which a pin function is set or a notification for which a snooze function is set. According to some embodiments, the processor 120 may determine the first notification among the plurality of notifications included in the notification list to be a notification for which a pin function is set or a notification for which a snooze function is set, according to an input by a user.

In operation 305, the processor 120 may display the notification list including the reminder notification on the display device 160. According to some embodiments, the processor 120 may display the notification list including a reminder notification to which a pin indicator is added and second notifications for which pin function is not set, that is, to which pin indicators are not added, on the display device 160. In this instance, the reminder notification (e.g., the first notification) to which a pin indicator is added may not be deleted from the notification list although an input for initializing the notification list is detected, but the second notifications to which pin indicators are not added may be deleted from the notification list when the input for initializing the notification list is detected. According to various embodiments, the processor 120 may maintain the second notifications, to which the snooze function is not applied, in the notification list, may delete a reminder notification for which a snooze function is set, and may add the reminder notification again to the notification after a predetermined period of time, and display the same on the display device 160. According to other embodiments, a pin function may be set for the first notification, and a snooze function may be set for one of the second notifications for which the pin function is not set.

In some embodiments, operations of FIG. 3 may be performed sequentially, but it is not necessarily limited thereto. For example, the order of operations may be changed, and at least two operations may be performed in parallel. Also, in some embodiments, all of the operations of FIG. 3 may not need to be performed, and some of the operations may be omitted.

Figure 4A:
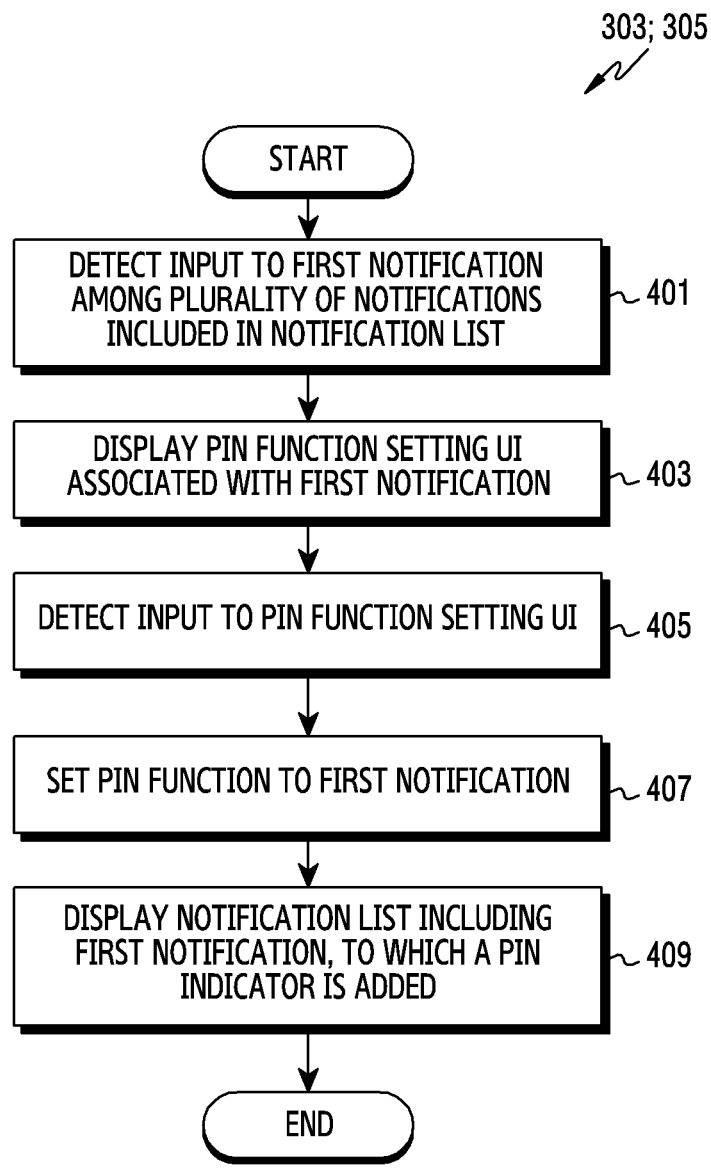
FIG. 4A is a flowchart illustrating a process of setting a pin function for a notification according to various embodiments.

FIG. 4A is a flowchart illustrating a process of setting a pin function for a notification according to various embodiments. Each operation in FIG. 4A may be performed by the electronic device 101 of FIG. 1, or the processor 120 of the electronic device 101.

Figure 4B:
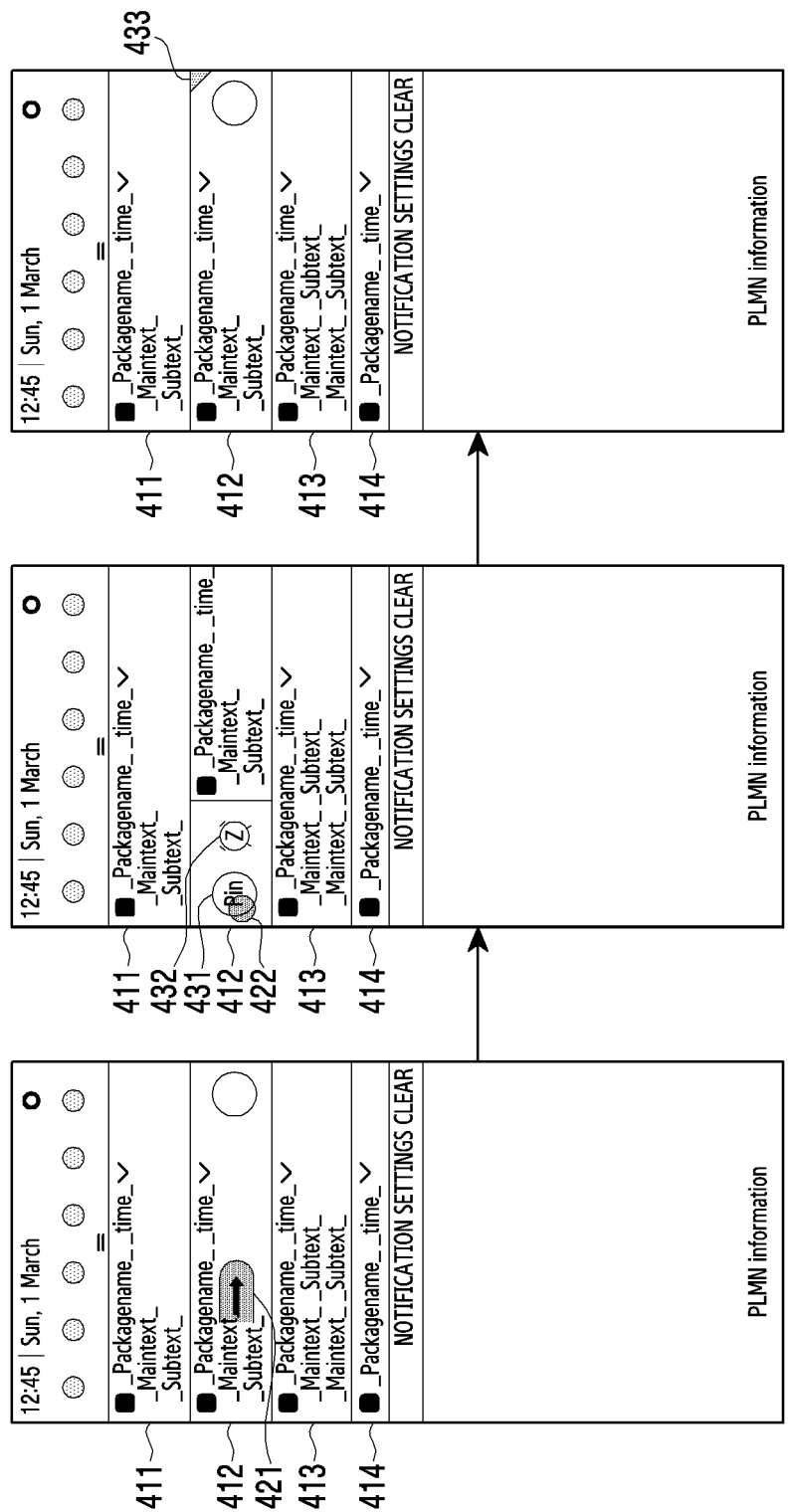
FIG. 4B is a conceptual diagram illustrating setting of a pin function for a notification according to various embodiments.

Referring to FIG. 4A, in operation 401, the processor 120 may detect an input to a first notification among a plurality of notifications included in a notification list. The input to the first notification may refer to an input for displaying a pin function setting user interface (UI). According to some embodiments, the processor 120 may detect a swipe input of a user with respect to the first notification, on the display device 160. Here, the swipe input refers to an input that provides a touch by sliding in a predetermined direction (e.g., left or right). For example, referring to FIG. 4B, the processor 120 may detect a swipe input 421 provided to a notification 412 among a plurality of notifications 411, 412, 413, and 414 included in the notification list. According to some embodiments, the first notification may be a group notification or one of a plurality of child notifications included in the group notification.

In operation 403, the processor 120 may display a pin function setting UI associated with the first notification on the display device 160, upon detection of the input to the first notification. Here, the pin function setting UI may refer to a UI used for setting a pin function for the first notification. For example, referring to FIG. 4B, the processor 120 may display a pin function setting UI 431 associated with the notification 412 on the display device 160, upon detection of the swipe input 421 to the notification 412. According to some embodiments, the processor 120 may display the pin function setting UI 431 together with a snooze function setting UI 432.

In operation 405, the processor 120 may detect an input to the pin function setting UI. According to some embodiments, the processor 120 may detect a tap input of a user with respect to the pin function setting UI, on the display device 160. Here, the tap input refers to an input that provides a single touch and immediately leaves. For example, referring to FIG. 4B, the processor 120 may detect a tap input 422 to the pin function setting UI 431.

In operation 407, the processor 120 may set a pin function for the first notification, upon detection of the input to the pin function setting UI. That is, the processor 120 may determine that the first notification to be a notification for which a pin function is set. For example, referring to FIG. 4B, the pin function may be set for the notification 412.

In operation 409, the processor 120 may display the notification list including the first notification, to which a pin indicator is added, on the display device 160. Here, the pin indicator refers to a UI for indicating that the first notification is a notification for which a pin function is set. According to some embodiments, the ranking of the first notification for which a pin function is set may not be changed. Here, rankings may refer to the order of locations of the notifications in the notification list. For example, Referring to FIG. 4B, the processor 120 may display the notification list including the first notification, to which a pin indicator 433 is added, on the display device 160. In this instance, the shape and the location of a pin indicator has no limit.

In some embodiments, operations of FIG. 4A may be performed sequentially, but it is not necessarily limited thereto. For example, the order of operations may be changed, and at least two operations may be performed in parallel. Also, in some embodiments, all of the operations of FIG. 4A may not need to be performed, and some of the operations may be omitted.

Figure 4C:
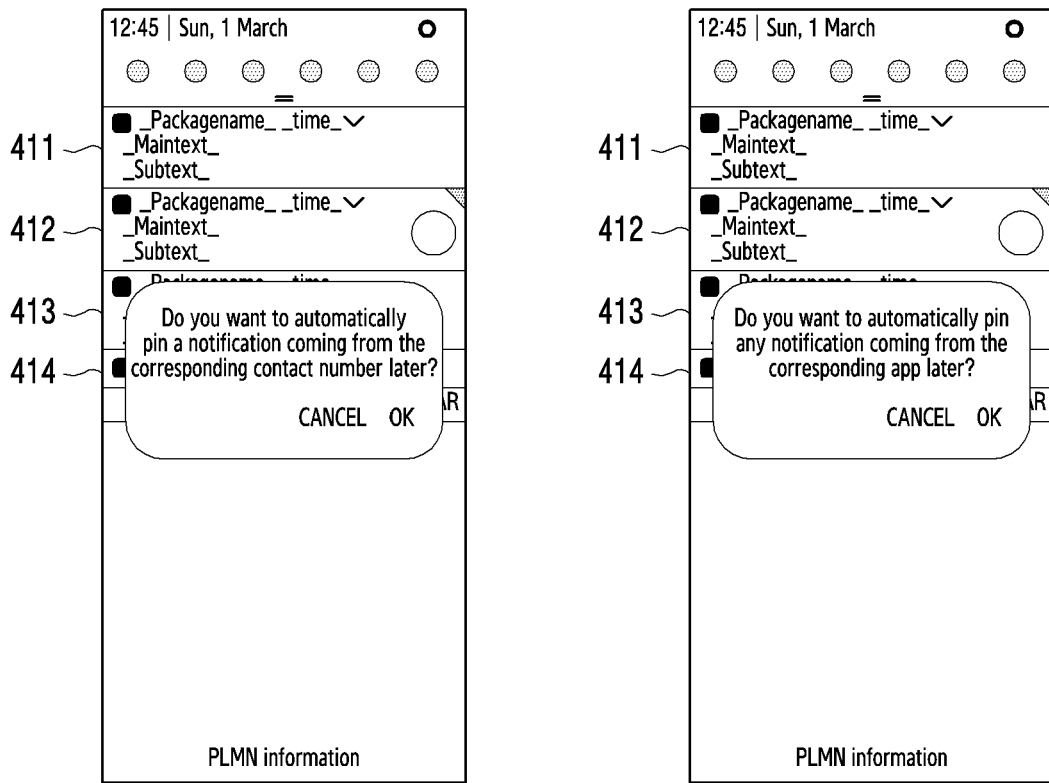
FIG. 4C is a conceptual diagram illustrating identifying whether to set a pin function for a notification according to various embodiments.

FIG. 4C is a conceptual diagram illustrating identifying whether to set a pin function for a notification according to various embodiments.

Referring to FIG. 4C, in some embodiments, if a pin function is set a predetermined number of times with respect to notifications of a predetermined application, the processor 120 may display a popup window to identify whether to always set a pin function for a notification of the corresponding application, on the display device 160. In this instance, the notifications may have different attributes. For example, if a pin function is set three times with respect to message notifications of a message application, the message notifications being associated with from different contact numbers, a popup window for identifying whether to set a pin function for all notifications of the corresponding message application may be displayed.

According to other embodiments, if a pin function is set a predetermined number of times with respect to notifications of a predetermined application, the notification having the same attribute, when a notification having the same attribute occurs again on the display device 160, the processor 120 may display a popup window for identifying whether to always set a pin function. For example, if a pin function is set 10 times with respect to missed call notifications of a phone application, the missed call notification being associated with the same contact number, a popup window for identifying whether to always set a pin function for a missed call notification associated with the corresponding contact number later on, may be displayed.

Figure 5A:
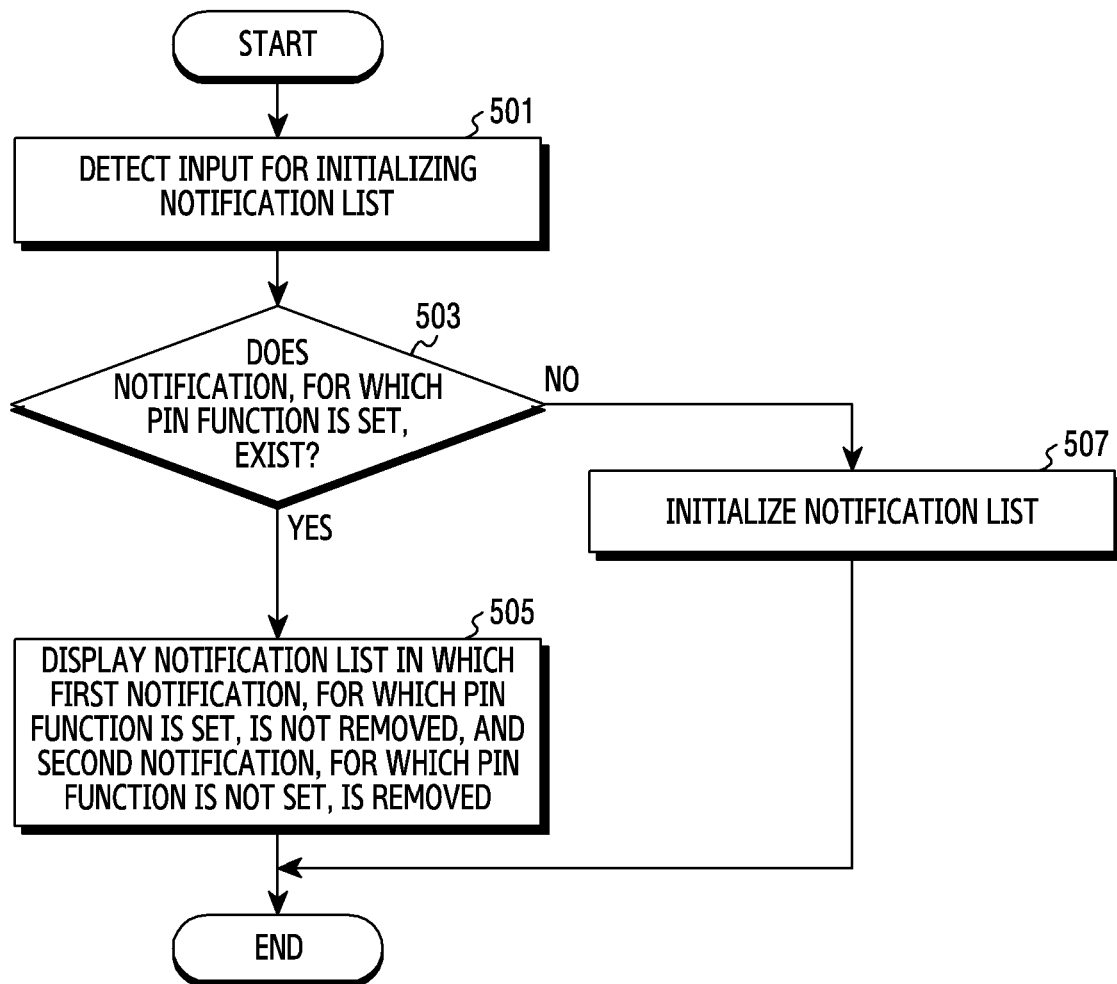
FIG. 5A is a flowchart illustrating a process of executing a pin function of a notification according to various embodiments.

FIG. 5A is a flowchart illustrating a process of executing a pin function of a notification according to various embodiments. Each operation in FIG. 5A may be performed by the electronic device 101 of FIG. 1, or the processor 120 of the electronic device 101.

Figure 5B:
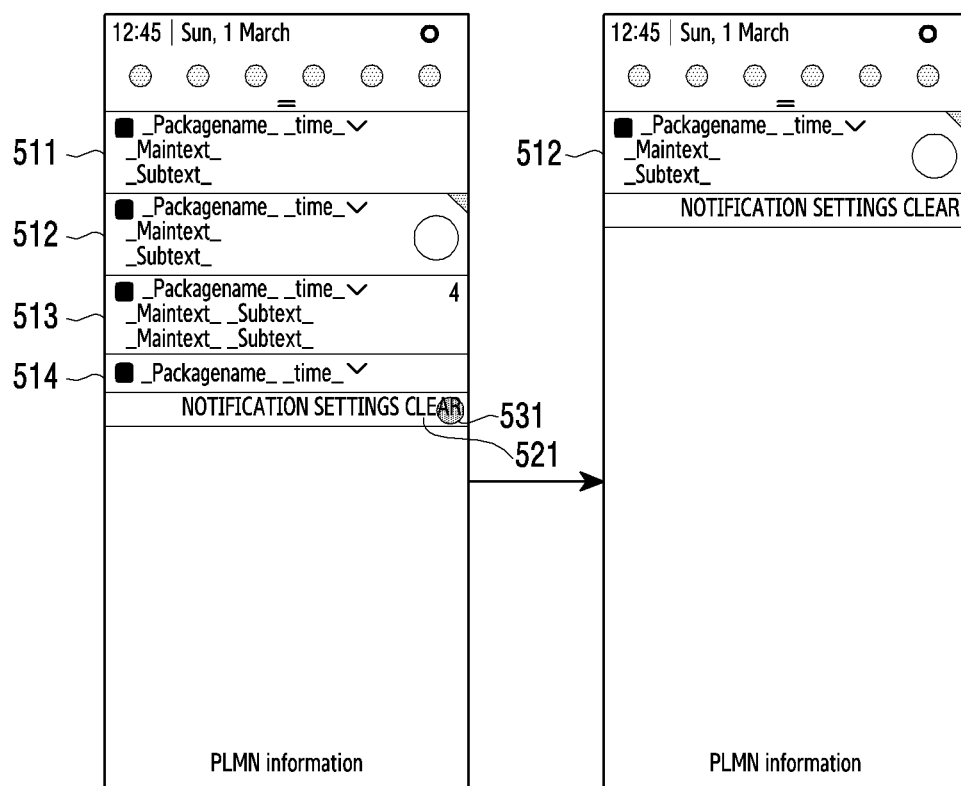
FIG. 5B is a conceptual diagram illustrating execution of a pin function of a notification according to various embodiments.

Referring to FIG. 5A, in operation 501, the processor 120 may detect an input for initializing a notification list. That is, the processor 120 may detect an input for deleting a plurality of notifications included in a current notification list. For example, referring to FIG. 5B, the processor 120 may detect a tap input 531 of a user, which is for initializing the notification list, to "CLEAR" 521 which is a notification list initializing UI.

If the processor 120 identifies that a notification for which a pin function is set exists in operation 503, the processor 120 may display a notification list in which a first notification, for which a pin function is set, is not deleted and a second notification, for which a pin function is not set, is deleted, on the display device 160, in operation 505. Through the above, it is identified that the first notification for which the pin function is set is pinned onto the notification list. For example, referring to FIG. 5B, the processor 120 may display a notification list in which a notification 512, for which a pin function is set, is not deleted and second notifications 511, 513, and 514, for which a pin function is not set, are controlled.

Conversely, if the processor 120 identifies that no notification for which a pin function is set exists in operation 503, the processor 120 may initialize a notification list in operation 507. That is, the processor 120 may delete all notifications included in the notification list.

In some embodiments, operations of FIG. 5A may be performed sequentially, but it is not necessarily limited thereto. For example, the order of operations may be changed, and at least two operations may be performed in parallel. Also, in some embodiments, all of the operations of FIG. 5A may not need to be performed, and some of the operations may be omitted.

Figure 6A:
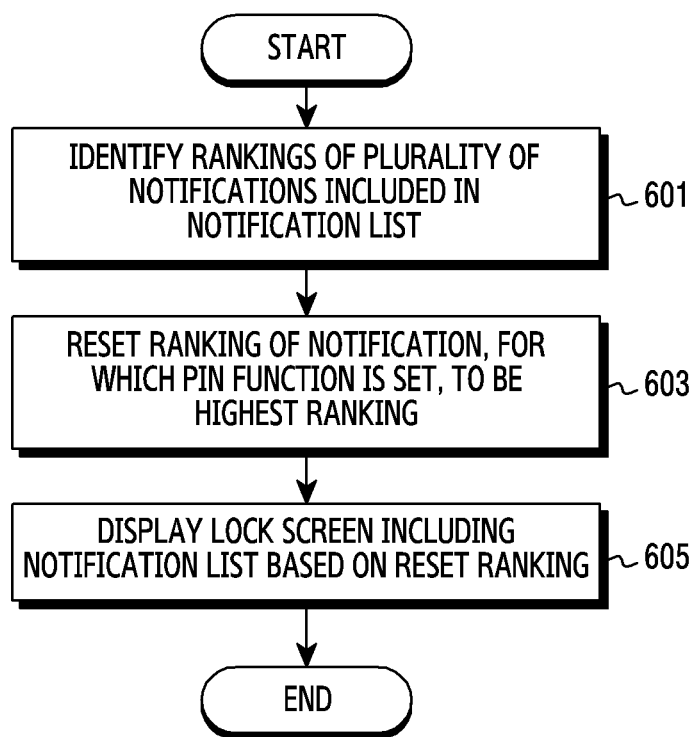
FIG. 6A is a flowchart illustrating a process of executing a pin function of a notification in a lock screen according to various embodiments.

FIG. 6A is a flowchart illustrating a process of executing a pin function of a notification in a lock screen according to various embodiments. Each operation in FIG. 6A may be performed by the electronic device 101 of FIG. 1, or the processor 120 of the electronic device 101.

Referring to FIG. 6A, in operation 601, the processor 120 may identify the rankings of a plurality of notifications included in a notification list. For example, the ranking of a notification at the top of the notification list may be set to 1. According to some embodiments, a ranking may be set according to a time at which a corresponding notification occurs. For example, the ranking of a notification that occurs first may be set to 1.

In operation 603, the processor 120 may reset the ranking of a notification for which a pin function is set as the highest ranking. For example, a notification which is ranked at fifth in the list before a pin function is set, may be reset to be ranked at first when a pin function is set. According to some embodiments, if two or more notifications, for which a pin function is set, exist, the processor 120 may reset rankings of the notifications, for which the pin function is set, sequentially from the highest ranking, according to a time at which each notification, for which a pin function is set, occurs For example, if the time at which a first notification for which a pin function is set occurs is 2 PM, and the time at which a second notification for which a pin function is set occurs is 3 PM, the processor 120 may set the ranking of the first notification to 1, and may set the ranking of the second notification to 2. In this instance, the rankings of the notifications for which a pin function is not set may be sequentially reset according to the time at which each notification, for which a pin function is not set, occurs, to be ranked subsequent to the rankings of the notification for which the pin function is set.

Figure 6B:
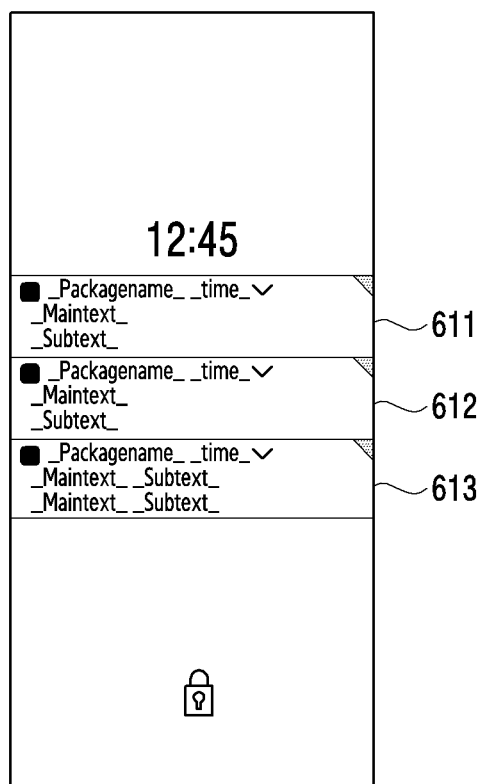
FIG. 6B is a conceptual diagram illustrating execution of a pin function of a notification in a lock screen according to various embodiments.

In operation 605, the processor 120 may display a lock screen including the notification list that is based on the reset rankings, on the display device 160. That is, the notifications, for which the pin function is set, may be ranked sequentially from the top of the notification list of the lock screen, according to their rankings. For example, referring to FIG. 6B, the rankings of a notification 611, a notification 612, and a notification 613, for which a pin function is set, are reset to 1, 2, and 3, respectively, and are sequentially ranked from the top of the notification list. Through the above, since a notification for which a pin function is set may be preferentially displayed, the notification list may be efficiently managed in a lock screen.

In some embodiments, operations of FIG. 6A may be performed sequentially, but it is not necessarily limited thereto. For example, the order of operations may be changed, and at least two operations may be performed in parallel. Also, in some embodiments, all of the operations of FIG. 6A may not need to be performed, and some of the operations may be omitted.

Figure 7A:
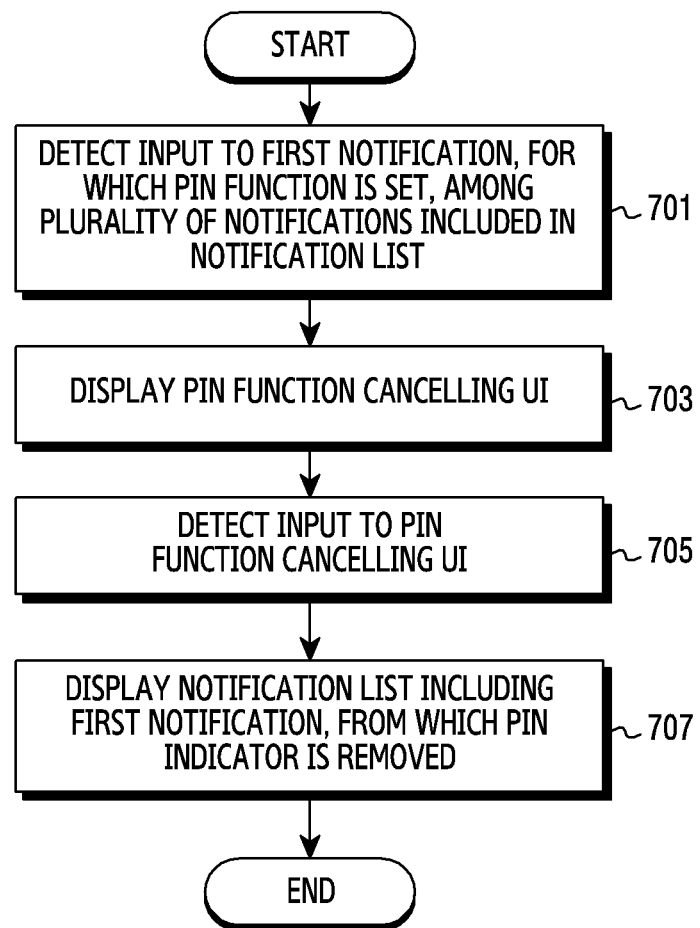
FIG. 7A is a flowchart illustrating a process of cancelling a pin function of a notification according to various embodiments.

FIG. 7A is a flowchart illustrating a process of cancelling a pin function of a notification according to various embodiments. Each operation in FIG. 7A may be performed by the electronic device 101 of FIG. 1, or the processor 120 of the electronic device 101.

Figure 7B:
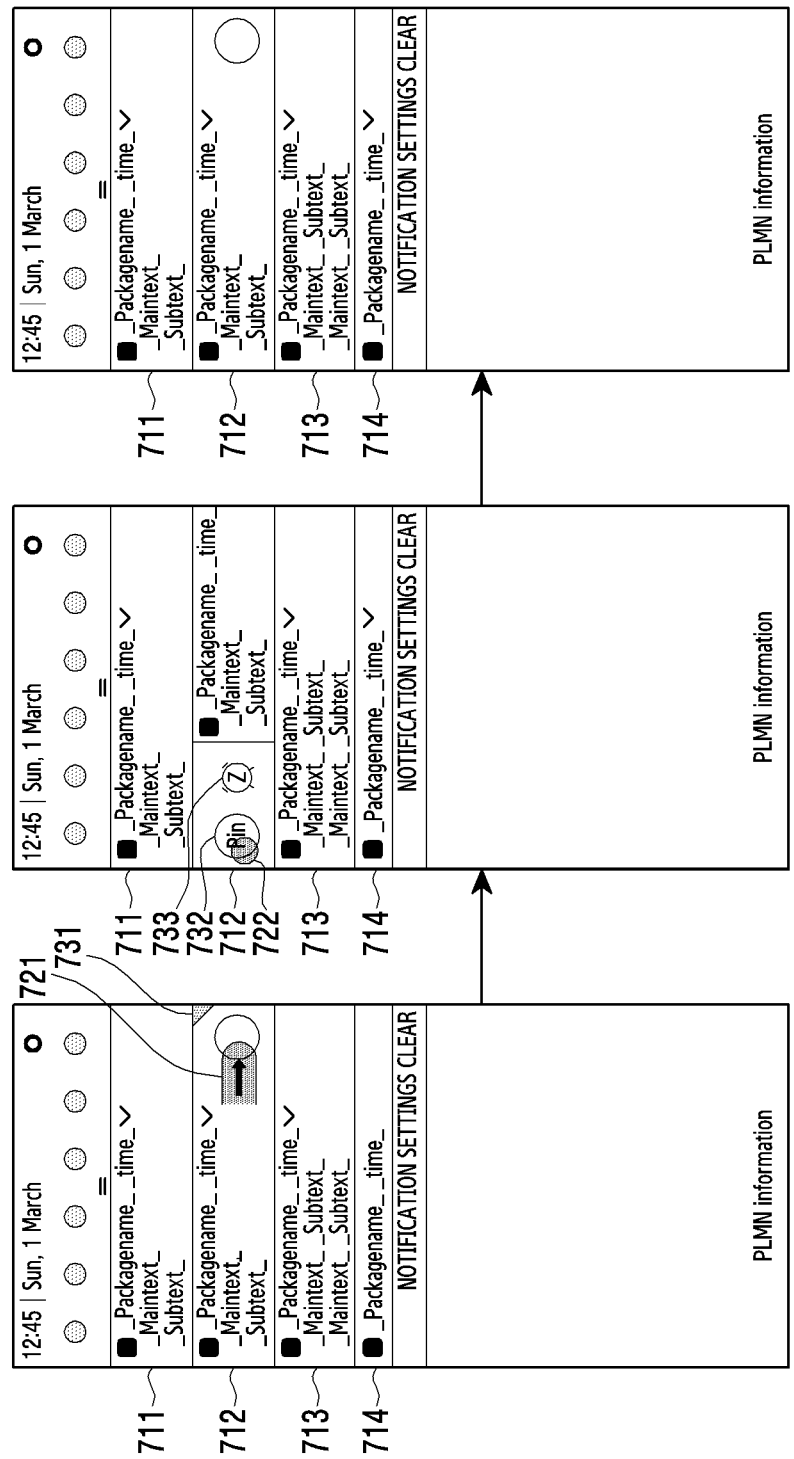
FIG. 7B is a conceptual diagram illustrating cancellation of a pin function of a notification according to various embodiments.

Referring to FIG. 7A, in operation 701, the processor 120 may detect an input to a first notification, for which a pin function is set, among a plurality of notifications included in a notification list. That is, the processor 120 may detect an input to the first notification, to which a pin indicator is added. Here, the input to the first notification may refer to an input for displaying a pin function cancelling user interface (UI). For example, referring to FIG. 7B, the processor 120 may detect a swipe input 721 to a notification 712 to which a pin indicator 731 is added.

In operation 703, the processor 120 may display a pin function cancelling UI on the display device 160. Here, the pin function cancelling UI may refer to a UI used for cancelling a pin function set for the first notification. For example, referring to FIG. 7B, the processor 120 may display a pin function cancelling UI 732 on the display device 160. In this instance, since a pin function is set for the first notification, a snooze setting UI 733 may be deactivated.

In operation 705, the processor 120 may detect an input to the pin function cancelling UI. According to some embodiments, the processor 120 may detect a tap input of a user with respect to the pin function cancelling UI on the display device 106. For example, referring to FIG. 7B, the processor 120 may detect a tap input 722 to the pin function cancelling UI 732.

In operation 707, the processor 120 may display the notification list including the first notification, from which a pin indicator is deleted, on the display device 160. That is, the processor 120 may display the notification list including the first notification, for which the pin function is cancelled, and the remaining second notifications, on the display device 160. For example, referring to FIG. 7B, the processor 120 may display the notification list including the notification 712, for which the pin function is cancelled, and the remaining second notifications 711, 713, and 714.

According to some embodiments, operations of FIG. 7A may be performed sequentially, but it is not necessarily limited thereto. For example, the order of operations may be changed, and at least two operations may be performed in parallel. Also, according to some embodiments, all of the operations of FIG. 7A may not need to be performed, and some of the operations may be omitted.

Figure 8A:
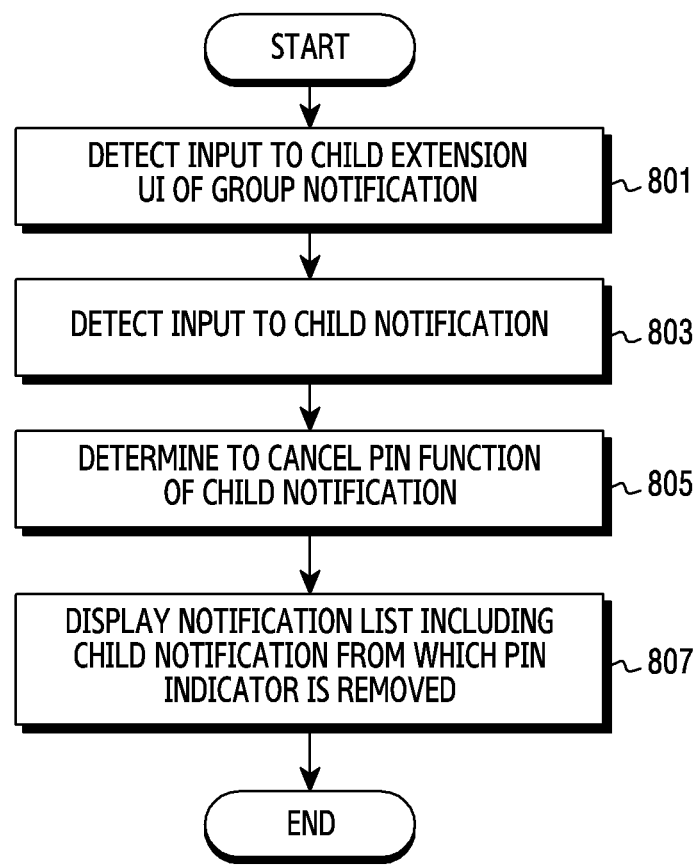
FIG. 8A is a flowchart illustrating a process of cancelling a pin function of a child notification according to various embodiments.

FIG. 8A is a flowchart illustrating a process of cancelling a pin function of a child notification according to various embodiments. Each operation in FIG. 8A may be performed by the electronic device 101 of FIG. 1, or the processor 120 of the electronic device 101.

Referring to FIG. 8A, in operation 801, the processor 120 may detect an input to a child extension UI of a group notification including a plurality of child notifications. Here, the plurality of child notifications refers to notifications that occur from different events of the same application. Also, the child extension UI may refer to a UI which is used for arranging and displaying a plurality of child notifications to identify detailed content of the plurality of child notifications included in the group notification. For example, referring to FIG. 8B, the processor 120 may detect a tap input 821 to a child extension UI 831 of a notification 813, which is a group notification including a plurality of child notifications 813-1, 813-2, 813-3, and 813-4. In this instance, a pin indicator 833 may be added to the notification 813 for which a pin function is set. In this instance, when a pin function is set for the notification 813 which is a group notification, a pin function may be set for each of the plurality of child notifications 813-1, 813-2, 813-3, and 813-4 included in the notification 813. Also, a child notification count UI 832 indicating the number of child notifications (e.g., 4) may be added to the notification 813 which is a group notification.

In operation 803, the processor 120 may detect an input to a child notification. For example, referring to FIG. 8B, the processor 120 may detect a swipe input 822 to the child notification 813-2 among the plurality of child notifications 813-1, 813-2, 813-3, and 813-4. In this instance, the pin indicator 833 of the notification 813 which is a group notification may be removed, and pin indicators 833-1, 833-2, 833-3, and 833-4 may be added to the plurality of child notifications 813-1, 813-2, 813-3, and 813-4.

In operation 805, the processor 120 may determine to cancel the pin function of the child notification. Particularly, the processor 120 may display a pin function cancelling UI associated with a child notification, on the display device 160. The processor 120 may detect a tap input to the pin function cancelling UI, and may determine to cancel the pin function of the child notification. That is, the processor 120 may determine to remove the pin indicator of the child notification.

In operation 807, the processor 120 may display the notification list including the child notification from which the pin indicator is removed. For example, referring to FIG. 8B, it is identified that the pin indicators 833-1, 833-2, and 833-4 of the child notifications 813-1, 813-3, and 813-4, for which the pin function is not cancelled, are maintained, but the pin indicator 833-2 of the child notification 813-2, for which the pin function is cancelled, is removed.

Figure 8B:
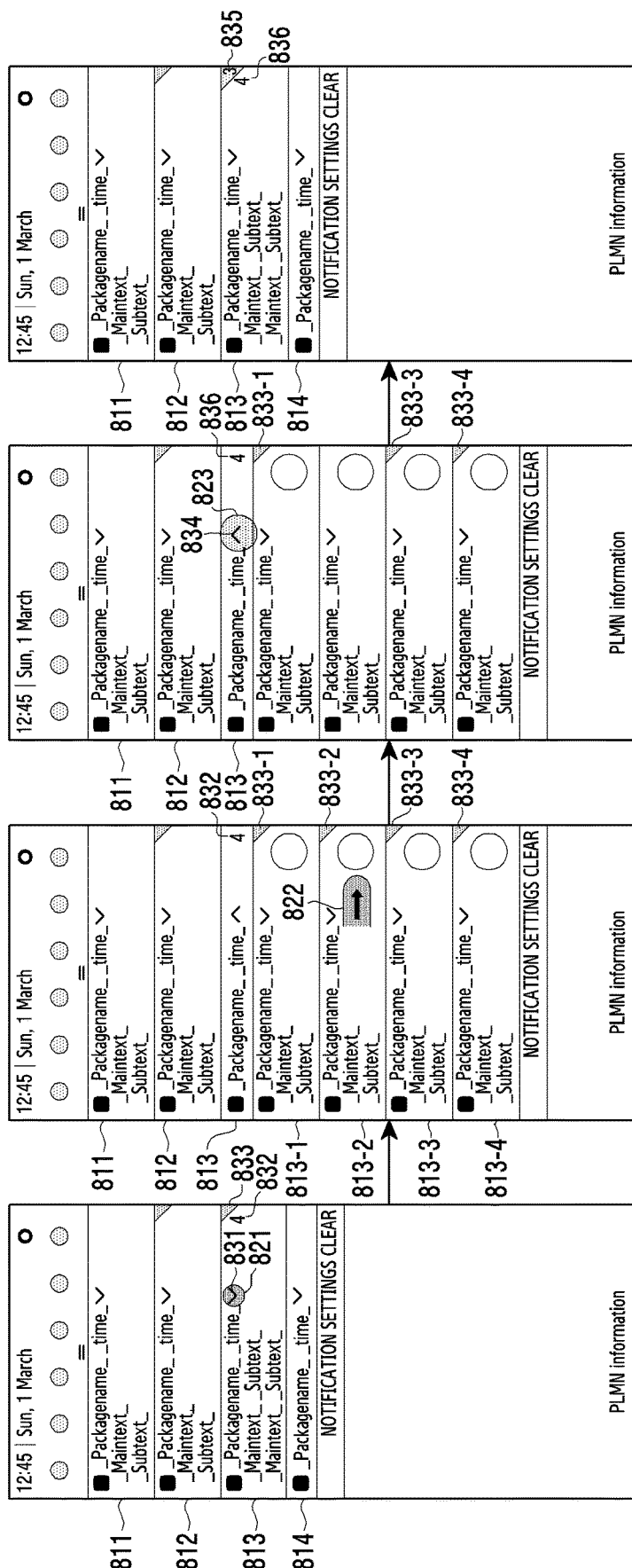
FIG. 8B is a conceptual diagram illustrating cancellation of a pin function of a child notification according to various embodiments.

According to some embodiments, referring to FIG. 8B, in the state in which the pin function of the child notification 813-2 is cancelled, if the processor 120 detects a tap input 823 to a child collapse UI 834, the child notifications 813-1, 813-2, 813-3, and 813-4 may be briefly displayed in the notification 813. In this instance, the pin indicator 833 may be added to the summary of the notification 813, and the number of notifications (e.g., 3), for which the pin function is currently set, may be displayed in the pin indicator 833.

In some embodiments, operations of FIG. 8A may be performed sequentially, but it is not necessarily limited thereto. For example, the order of operations may be changed, and at least two operations may be performed in parallel. Also, in some embodiments, all of the operations of FIG. 8A may not need to be performed, and some of the operations may be omitted.

Figure 9:
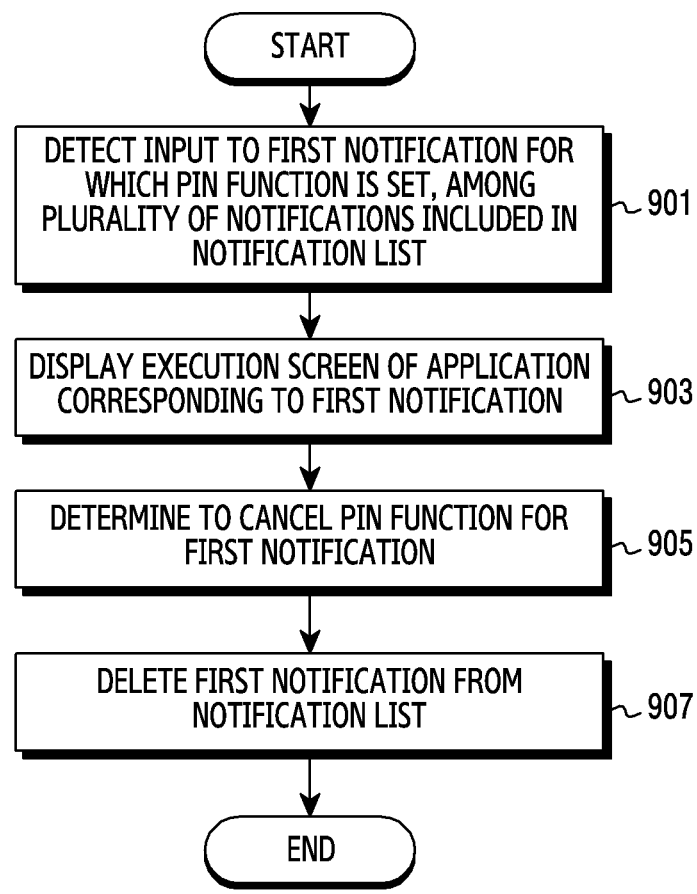
FIG. 9 is a flowchart illustrating a process of cancelling a pin function of a notification by identifying an execution screen of an application according to various embodiments.

FIG. 9 is a flowchart illustrating a process of cancelling a pin function of a notification by identifying an execution screen of an application according to various embodiments. Each operation in FIG. 9 may be performed by the electronic device 101 of FIG. 1, or the processor 120 of the electronic device 101.

Referring to FIG. 9, in operation 901, the processor 120 may detect an input to a first notification, for which a pin function is set, among a plurality of notifications included in a notification list. Here, the input to the first notification for which the pin function is set, may refer to an input for accessing an application associated with the first notification and for displaying the execution screen of the application corresponding to the first notification. For example, the processor 120 may detect a tap input to the first notification, for which the pin function is set.

In operation 903, the processor 120 may display the execution screen of the application corresponding to the first notification, on the display device 160. For example, if the first notification is a message reception notification, the processor 120 may display a screen that shows the content of the corresponding message on the display device 160.

In operation 905, the processor 120 may determine to cancel the pin function for the first notification. That is, when the execution screen of the application corresponding to the first notification is displayed, it is identified that the purpose of the first notification for notifying of the application event is achieved. Accordingly, the pin function for the first notification may be cancelled.

In operation 907, the processor 120 may determine to delete the first notification from the notification list. That is, when the execution screen of the application corresponding to the first notification is displayed, it is identified that the purpose of the first notification for notifying of the application event is achieved. Accordingly, the first notification may be deleted from the notification list.

In some embodiments, the operations of FIG. 9 may be performed sequentially, but it is not necessarily limited thereto. For example, the order of operations may be changed, and at least two operations may be performed in parallel. Also, in some embodiments, all of the operations of FIG. 9 may not need to be performed, and some of the operations may be omitted.

Figure 10A:
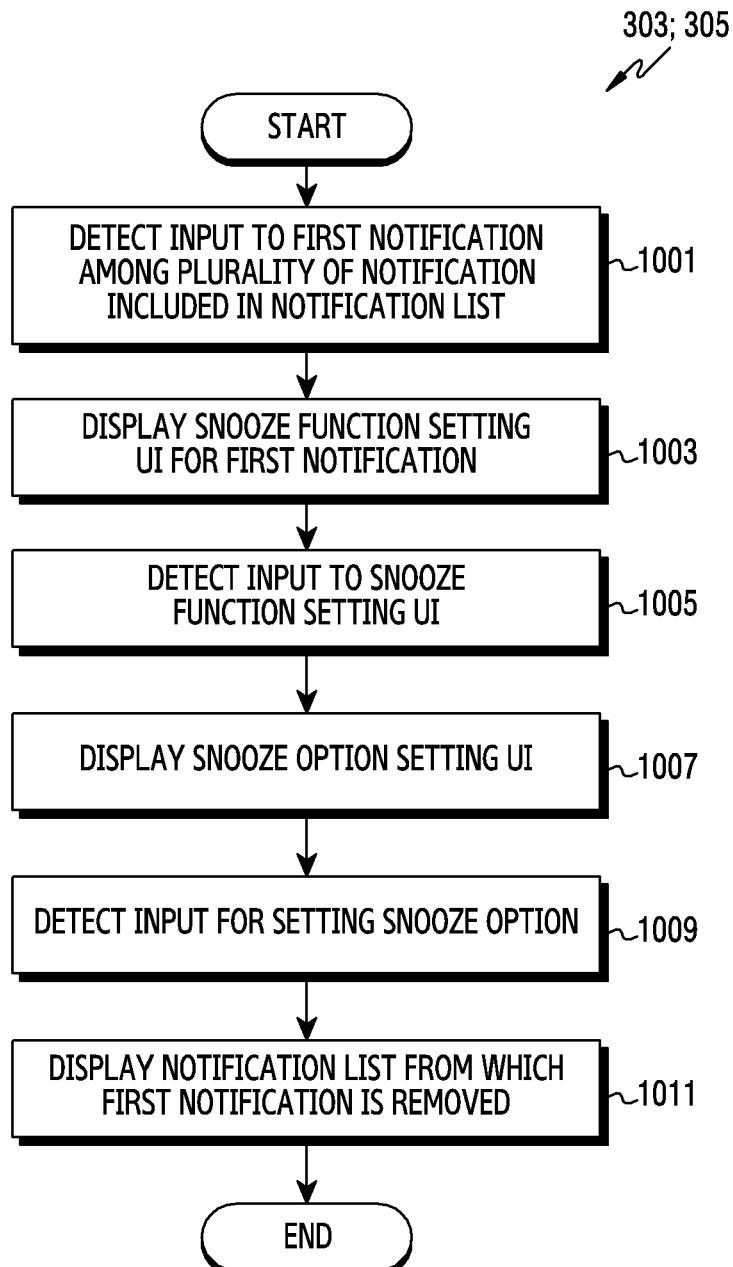
FIG. 10A is a flowchart illustrating a process of setting a snooze function for a notification according to various embodiments.

FIG. 10A is a flowchart illustrating a process of setting a snooze function for a notification according to various embodiments. Each operation in FIG. 10A may be performed by the electronic device 101 of FIG. 1, or the processor 120 of the electronic device 101.

Figure 10B:
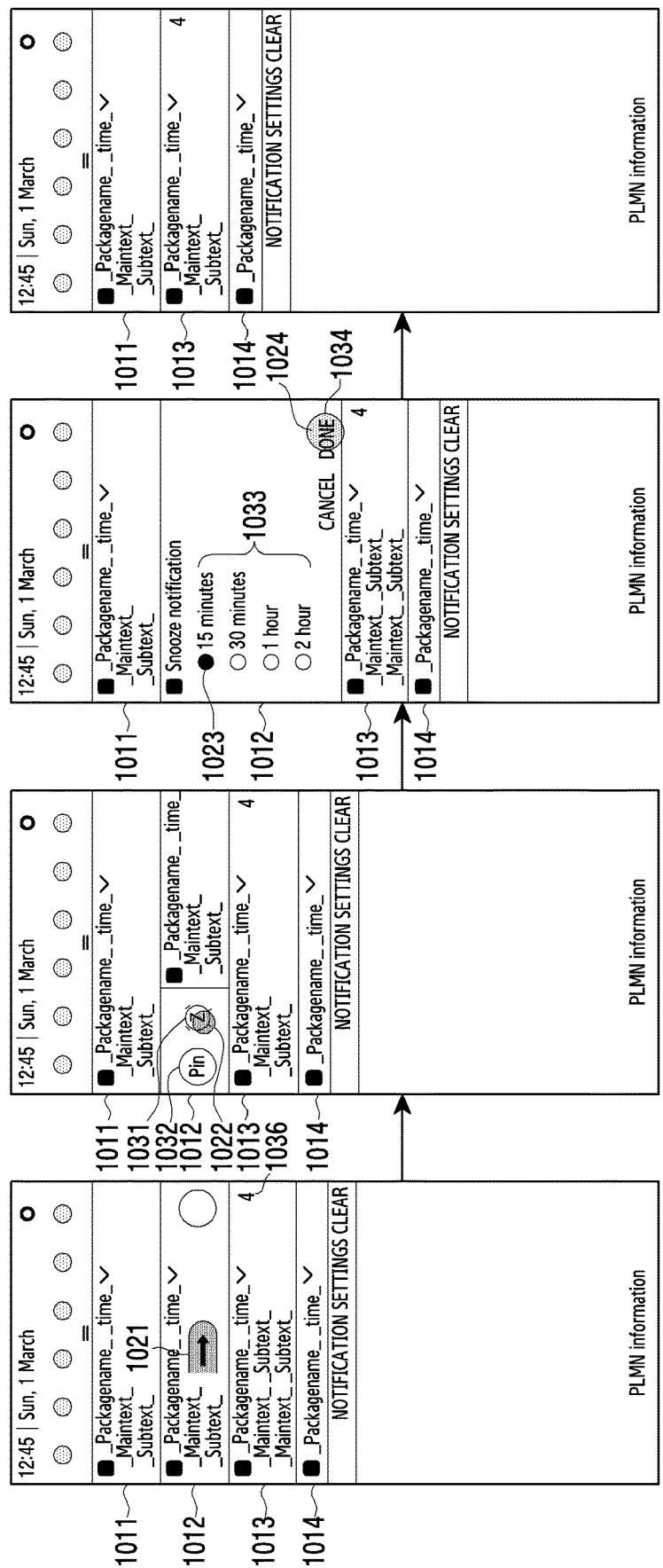
FIG. 10B is a conceptual diagram illustrating setting of a snooze function for a notification according to various embodiments.
Figure 10C:
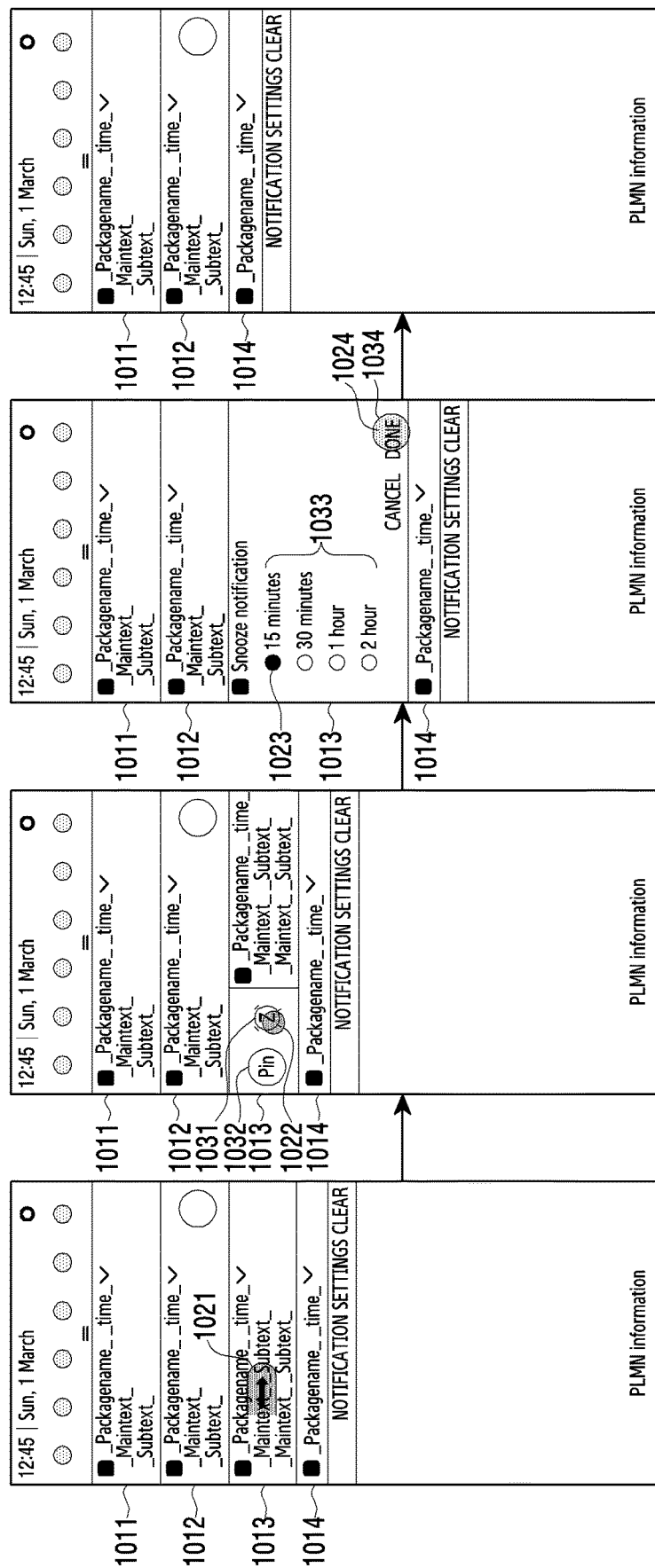
FIG. 10C is a conceptual diagram illustrating setting of a snooze function for a group notification according to various embodiments.

Referring to FIG. 10A, in operation 1001, the processor 120 may detect an input to a first notification among a plurality of notifications included in a notification list. The input to the first notification may refer to an input for displaying a snooze function setting UI. According to some embodiments, the processor 120 may detect a swipe input of a user with respect to the first notification, on the display device 160. For example, referring to FIG. 10B, the processor 120 may detect a swipe input 1021 provided to a notification 1012 among a plurality of notifications 1011, 1012, 1013, and 1014 included in the notification list. According to some embodiments, the first notification may be a group notification or may be one of a plurality of child notifications included in the group notification. For example, referring to FIG. 10C, the processor 120 may detect the swipe input 1021 provided to the notification 1013, which is a group notification, among the plurality of notifications 1011, 1012, 1013, and 1014 included in the notification list.

In operation 1003, the processor 120 may display a snooze function setting UI associated with the first notification on the display device 160. Here, the snooze function setting UI may refer to a UI used for setting a snooze function for the first notification. For example, referring to FIG. 10B, the processor 120 may display a snooze function setting UI 1031 associated with the notification 1012 on the display device 160, upon detection of the swipe input 1021 to the notification 1012. According to some embodiments, the processor 120 may display the snooze function setting UI 1031 together with a pin function setting UI 1032. According to other embodiments, referring to FIG. 10C, the processor 120 may display the snooze function setting UI 1031 associated with the notification 1013 on the display device 160, upon detection of the swipe input 1021 to the notification 1013 which is a group notification. According to some embodiments, the processor 120 may display the snooze function setting UI 1031 together the pin function setting UI 1032.

In operation 1005, the processor 120 may detect an input to the snooze function setting UI. According to some embodiments, the processor 120 may detect a tap input of a user with respect to the snooze function setting UI, on the display device 160. For example, referring to FIG. 10B, the processor 120 may detect a tap input 1022 to the snooze function setting UI 1031 of the notification 1012. As another example, referring to FIG. 10C, the processor 120 may detect the tap input 1022 to the snooze function setting UI 1031 of the notification 1013, which is a group notification.

In operation 1007, the processor 120 may display a snooze option setting UI on the display device 160. Here, according to some embodiments, the snooze option of the snooze option setting UI may include a time item for setting a time within which the first notification, for which the snooze function is set, is deleted from the notification list and is added again. For example, referring to FIGS. 10B and 10C, the time items 1033 may include 15 minutes, 30 minutes, 1 hour, and 2 hours.

In operation 1009, the processor 120 may detect an input to the snooze option setting UI. According to some embodiments, the processor 120 may detect an input to a time item UI, and may detect an input to a snooze option setting complete UI. For example, referring to FIGS. 10B and 10C, an input 1023 to "15 minutes" of the time item UI 1033 may be detected, and an input 1024 to "DONE" 1034 which is the snooze option setting complete UI may be detected. Through the above, a user may select a desired time, and may effectively set a snooze function.

In operation 1011, the processor 120 may display the notification list from which the first notification is deleted, on the display device 160. That is, the processor 120 may display the notification list in which the first notification, for which the snooze function is set, is deleted and only second notifications, for which the snooze function is not set, are included. In this instance, the deleted first notification may be added again to the notification list after the set snooze time elapses, and may be displayed. For example, referring to FIG. 10B, the notification list may be displayed in which the notification 1012 for which the snooze function is set is deleted and only the notifications 1011, 1013, and 1014 for which the snooze function is not set are included. In this instance, the deleted notification 1012 may be included in the notification list again after 15 minutes. As another example, referring to FIG. 10C, the notification list may be displayed in which the notification 1013 for which the snooze function is set is deleted and only the notifications 1011, 1012, and 1014 for which the snooze function is not set are included. That is, when the snooze function is applied to the notification 1013 which is a group notification, the snooze function may be applied to all of a plurality of child notifications included in the notification 1013.

According to some embodiments, in the state in which the first notification is deleted from the notification list since the snooze function is set for the first notification, the first notification may be added to the notification list again and displayed after the set snooze time elapses even though an input for initializing the notification list is detected. According to other embodiments, in the state in which the first notification is deleted from the notification list since the snooze function is set for the first notification, if an input for initializing the notification list is detected, a popup window for identifying whether to permanently delete the first notification from the notification list may be displayed. In this instance, if a user input for permanently deleting the first notification is detected in the popup window, the first notification may not be added again to the notification list for display, even though the set snooze time elapses. Conversely, if a user input for not permanently deleting the first notification is detected in the popup window, the first notification may be added again to the notification list for display, after the set snooze time elapses. According to other embodiments, in the state in which access to an application associated with the first notification occurs and the execution screen of the application corresponding to the first notification is displayed, the first notification is deleted, and thus, the first notification may not be added again to the notification list even though the set snooze time elapses.

In some embodiments, operations of FIG. 10A may be performed sequentially, but it is not necessarily limited thereto. For example, the order of operations may be changed, and at least two operations may be performed in parallel. Also, in some embodiments, all of the operations of FIG. 10A may not need to be performed, and some of the operations may be omitted.

Figure 11A:
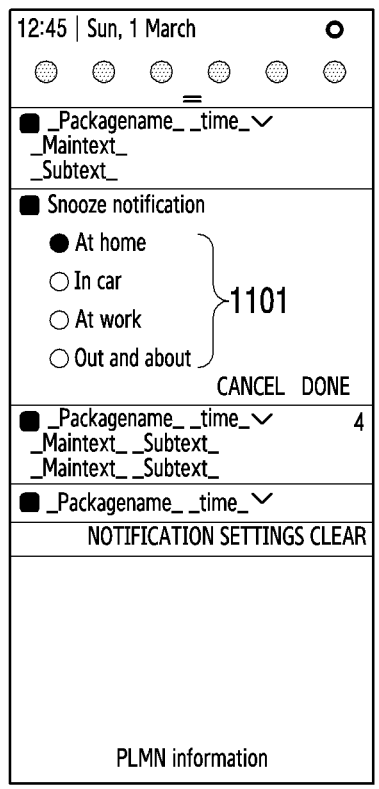
FIG. 11A is a conceptual diagram illustrating setting of a location-based snooze function according to various embodiments.
Figure 11B:
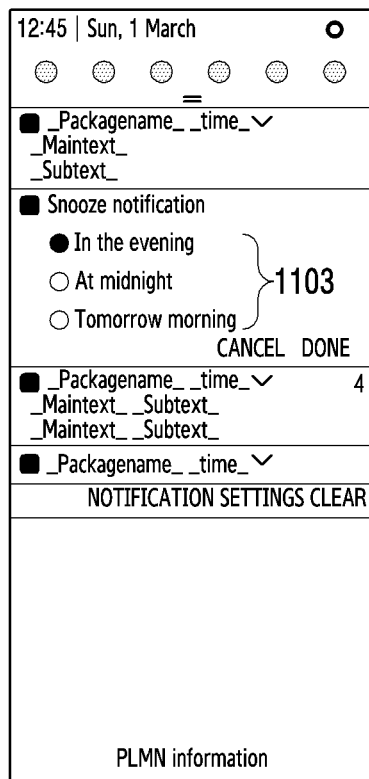
FIG. 11B is a conceptual diagram illustrating setting of a time slot-based snooze function according to various embodiments.

FIG. 11A is a conceptual diagram illustrating setting of a location-based snooze option according to various embodiments. FIG. 11B is a conceptual diagram illustrating setting of a time slot-based snooze option according to various embodiments.

Referring to FIG. 11A, a snooze option of a snooze option setting UI may include a location item 1101 for making a setting that deletes a first notification, for which a snooze function is set, from a notification list, and adds the first notification again to the notification list when the electronic device 101 is located in a predetermined place. For example, the location item 1101 may include a home, a car, a work, and the outside (out and about).

Referring to FIG. 11B, the snooze option of the snooze option setting UI may include a time slot item 1103 for setting a time within which the first notification, for which the snooze function is set, is deleted from the notification list and is added again. Here, the time item 1103 may include 3 time slots subsequent to the current time slot, the time slots being obtained by dividing one day (24 hours) by 6 hours. For example, the time slot item may include morning (6 AM), afternoon (12 PM), evening (6 PM), and midnight (12 AM). In this instance, if the snooze function is set to 3 PM, the time slot item 1103 may include evening, midnight, and tomorrow morning.

Figure 12:
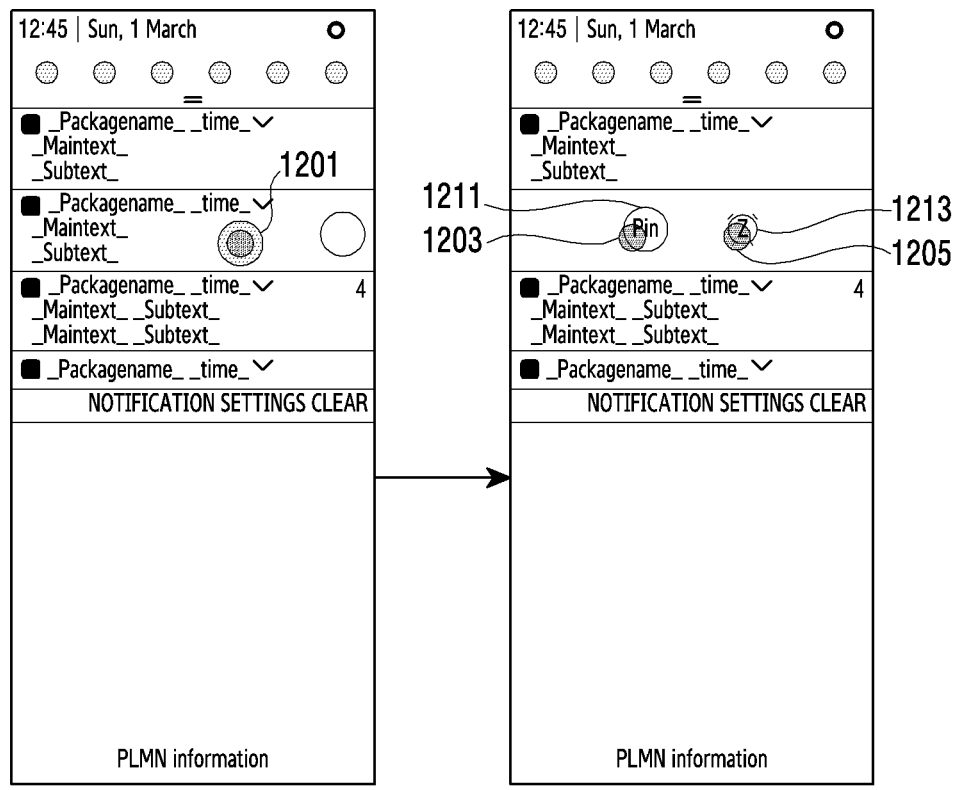
FIG. 12 is a conceptual diagram illustrating display of a pin function setting user interface (UI) and a snooze function setting UI according to various embodiments.

FIG. 12 is a conceptual diagram illustrating display of a pin function setting UI and a snooze function setting UI according to various embodiments.

Referring to FIG. 12, the processor 120 may detect a long tap input 1201 to one of a plurality of notifications included in a notification list, on the display device 160. The long tap input 1201 may refer to an input for displaying a pin function setting UI and a snooze function setting UI. Here, the long tap input may refer to an input that provides a touch and leaves after a predetermined period of time.

Subsequently, the processor 120 may display a pin function setting UI 1211 and a snooze function setting UI 1213 associated with a notification on the display device 160, upon detection of the long tap input to the notification. In this instance, the processor 120 may set a pin function for the notification, upon detection of a tap input 1203 to the pin function setting UI 1211. Also, the processor 120 may set a snooze function for the notification, upon detection of a tap input 1205 to the snooze function setting UI 1213.

According to some embodiments, the processor 120 may display a pin function setting UI when a tap input is detected, and may display a snooze function setting UI when a pressure input is detected. Here, the pressure input may refer to an input that is recognized when the pressure of a touch input is detected and the pressure is greater than or equal to a threshold value.

The electronic device 101 according to various embodiments of the disclosure may be any one of various types of devices. The electronic device may include at least one of, for example, a portable communication device (e.g., smart phone), a computing device, a portable multimedia device, a portable medical device, a camera, a wearable device, and a home appliance. The electronic device 101 according to embodiments of the disclosure is not limited to the above-mentioned devices.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly or via another element (e.g., third element).

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The invention claimed is:

1. An operation method of an electronic device, the electronic device comprising: displaying a notification list;
   determining a first notification among a plurality of notifications included in the notification list, upon detection of a first input at the first notification; and
   displaying an updated notification list including the first notification to which a graphic indication is added based on the determination, wherein the first notification with the pin graphic indication added, corresponding to the first input is maintained in the updated notification list even though a second input for deleting all notifications included in the updated notification list is detected, and
   wherein a second notification, not corresponding to the first input, among the plurality of notifications is deleted from the updated notification list, upon detection of the second input.

2. The method as claimed in claim 1, wherein the first notification includes a group notification including a plurality of child notifications, and wherein the plurality of child notifications includes notifications incurred by different events of the same application.

3. The method as claimed in claim 1, further comprising: determining a third notification among the plurality of notifications included in the updated notification list, upon detection of a third input, wherein the third notification is configured to be deleted from the updated notification list, and to be added to the updated notification list as a predetermined period of time elapses.

4. The method as claimed in claim 1, wherein the displaying the updated notification list that is based on the determination comprises: displaying the updated notification list including the first notification to which a pin indicator is added, and wherein the pin indicator is to indicate that the first notification is not deleted even though the second input is detected.

5. An electronic device, comprising:
   a display; and
   at least one processor, wherein the at least one processor is configured to perform control so as to:
   display a notification list, determine a first notification among a plurality of notifications included in the notification list, upon detection of a first input at the first notification, and
   display an updated notification list that is including the first notification to which a graphic indication is added based on the determination, wherein the first notification with the pin graphic indication added, corresponding to the first input is maintained in the updated notification list even though a second input for initializing deleting all notifications included in the updated notification list is detected, and wherein a second notification, not corresponding to the first input, among the plurality of notifications is deleted from the updated notification list upon detection of the second input.

6. The electronic device as claimed in claim 5, wherein the first notification includes a notification group including a plurality of child notifications, and wherein the plurality of child notifications includes notifications incurred by different events of the same application.

7. The electronic device as claimed in claim 5, wherein the at least one processor is configured to perform control so as to determine a third notification among the plurality of notifications included in the updated notification list, upon detection of a third input, and wherein the third notification is deleted from the updated notification list, and is added to the updated notification list as a predetermined period of time elapses.

8. The electronic device as claimed in claim 5, wherein the at least one processor is configured to perform control so as to display the updated notification list including the first notification to which a pin indicator is added, and wherein the pin indicator is to indicate that the first notification is not deleted from the updated notification list even though the second input is detected.

* * * * *